US012767004B2

(12) United States Patent
Loehnert et al.

(10) Patent No.: US 12,767,004 B2
(45) Date of Patent: Oct. 20, 2026

(54) ON-BOARD ELECTRICAL SYSTEM FOR A MOTOR VEHICLE AND METHOD FOR OPERATING AN ON-BOARD ELECTRICAL SYSTEM FOR A MOTOR VEHICLE

(71) Applicant: Schaeffler Technologies AG & Co. KG, Herzogenaurach (DE)

(72) Inventors: Victoria Loehnert, Adelsdorf (DE); Markus Kraus, Roßtal (DE); Benjamin Wuebbolt-Gorbatenko, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 56 days.

(21) Appl. No.: 18/835,805

(22) PCT Filed: Jan. 16, 2023

(86) PCT No.: PCT/DE2023/100026
§ 371 (c)(1),
(2) Date: Aug. 5, 2024

(87) PCT Pub. No.: WO2023/151741
PCT Pub. Date: Aug. 17, 2023

(65) Prior Publication Data

US 2025/0135951 A1 May 1, 2025

(30) Foreign Application Priority Data

Feb. 11, 2022 (DE) ..................... 10 2022 103 267.1

(51) Int. Cl.
*B60L 58/20* (2019.01)
*B60L 1/00* (2006.01)
*B60L 3/00* (2019.01)

(52) U.S. Cl.
CPC ................. *B60L 58/20* (2019.02); *B60L 1/00* (2013.01); *B60L 3/00* (2013.01); *B60L 2210/10* (2013.01)

(58) Field of Classification Search
CPC .... B60L 58/20; B60L 1/00; B60L 3/00; B60L 2210/10; B60L 2210/14; B60L 3/003; B60L 3/0092
USPC ......................................................... 701/29.2
See application file for complete search history.

(56) References Cited

FOREIGN PATENT DOCUMENTS

| | | | | |
|---|---|---|---|---|
| DE | 102010046616 A1 * | 3/2012 | ............ H02J 7/1438 |
| DE | 102015214231 A1 | 2/2017 | |
| DE | 102016103829 A1 | 9/2017 | |
| WO | WO-2017016747 A1 * | 2/2017 | ............. B60L 1/003 |

* cited by examiner

*Primary Examiner* — Maceeh Anwari

(57) ABSTRACT

The disclosure relates to an on-board electrical system for a motor vehicle having a first partial on-board electrical system which has a first on-board electrical system voltage, a second partial on-board electrical system which has a second on-board electrical system voltage, lower than the first on-board electrical system voltage, a first and a second DC/DC converter which are each arranged between the first and the second partial on-board electrical system, and an energy store arranged in the second on-board electrical system. The disclosure also relates to a method for operating such an electrical system.

17 Claims, 1 Drawing Sheet

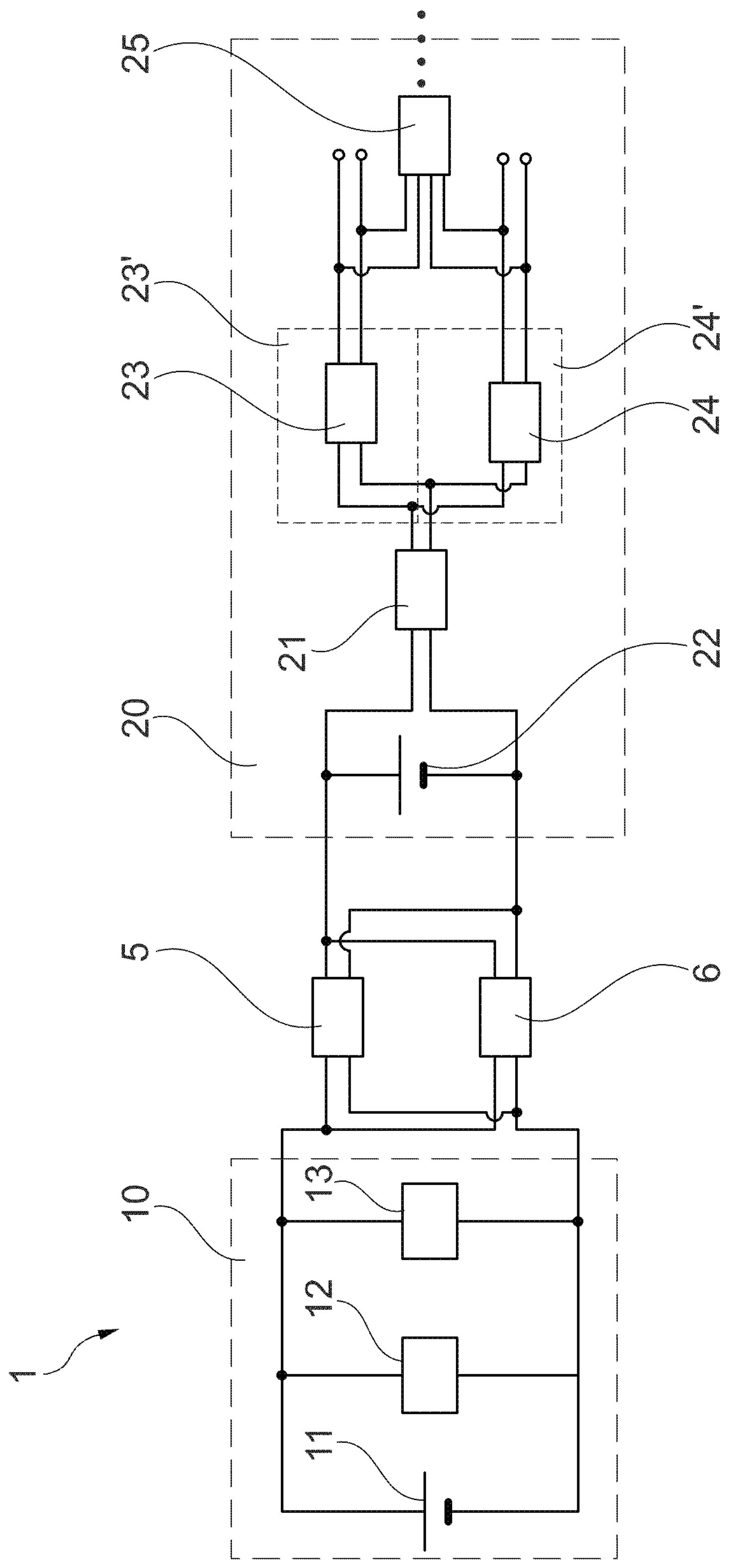
25
23'
23
24'
24
21
22
20
5
6
10
13
12
11
1

ON-BOARD ELECTRICAL SYSTEM FOR A MOTOR VEHICLE AND METHOD FOR OPERATING AN ON-BOARD ELECTRICAL SYSTEM FOR A MOTOR VEHICLE

CROSS-REFERENCE TO RELATED APPLICATIONS

This application is the U.S. National Phase of PCT Application No. PCT/DE2023/100026 filed on Jan. 16, 2023, which claims priority to DE 10 2022 103 267.1 filed on Feb. 11, 2022, the entire disclosures of which are incorporated by reference herein.

TECHNICAL FIELD

The disclosure relates to an on-board electrical system for a motor vehicle. The disclosure further relates to a method for operating an on-board electrical system for a motor vehicle.

BACKGROUND

The disclosure can be used in motor vehicles, for example electric or hybrid vehicles, which are designed for autonomous driving. Such vehicles typically have electrical components that provide safety-relevant functions for autonomous driving. In order to meet the considerable safety requirements for such a vehicle, on-board electrical systems must be able to provide a highly reliable power supply with a low probability of failure. The prior art already encompasses on-board electrical systems for motor vehicles that have multiple low-voltage batteries and provide a certain degree of redundancy. In the case of a failure of one battery, the operating voltage for the electrical components can be provided by the other battery. In this way, safety-relevant functions such as steering or opening the doors can be carried out even in the event of a battery failure. However, an on-board electrical system with multiple batteries suffers the disadvantages of increased weight and space requirements as well as higher costs due to the additional battery.

SUMMARY

Against this background, the object is to increase the reliability of a vehicle with the least possible impact on weight, space requirements and costs.

The object is achieved by an on-board electrical system for a motor vehicle, having: i) a first partial on-board electrical system which has a first on-board electrical system voltage, ii) a second partial on-board electrical system which has a second on-board electrical system voltage lower than the first on-board electrical system voltage, iii) a first and a second DC-DC converter which are each arranged between the first and the second partial on-board electrical system, and, iv an energy store which is arranged in the second on-board electrical system.

The on-board electrical system according to the disclosure comprises two DC-DC converters which are arranged between the first and the second partial on-board electrical system. In a normal operating mode, electrical energy can be supplied from the first partial on-board electrical system to the second partial on-board electrical system via these DC-DC converters in order to supply electrical components of the second partial on-board electrical system. In the event of a failure of one of the two DC-DC converters, the supply to the second partial on-board electrical system can be maintained by the respective other DC-DC converter. The energy store of the second on-board electrical system can reduce voltage fluctuations in the second on-board electrical system in the normal operating mode. If both DC-DC converters fail or the first on-board electrical system voltage of the first partial on-board electrical system drops, the energy store of the second partial on-board electrical system can supply the electrical components of the second on-board electrical system, at least for a short time. In this respect, the on-board electrical system according to the disclosure can increase the reliability of the motor vehicle. As it is not necessary to provide a second energy store in the second partial on-board electrical system, there is only a minor impact on weight, space requirements and costs.

In an example embodiment, the first on-board electrical system voltage is in a range of 400 V to 800 V and the second on-board electrical system voltage is in a range of 12 V to 48 V. In an example embodiment, the energy store is designed as a battery or accumulator, wherein lead accumulators and lithium-ion accumulators are particularly suitable. Alternatively, all other forms of energy store that can supply electrical components with voltage for a small period of time, such as a capacitor, can be considered. In an example embodiment, the DC-DC converters are used to convert the first on-board electrical system voltage to the level of the second on-board electrical system voltage. In an example embodiment, the second on-board electrical system voltage is used to supply electrical components of the vehicle that perform safety-relevant functions.

According to an example embodiment, the first partial on-board electrical system has a high-voltage energy store so that both DC-DC converters can be constantly supplied with energy from the first partial on-board electrical system in the normal operating mode.

According to an example embodiment, the on-board electrical system has a control device which is configured such that, in a normal operating mode, energy from the first partial on-board electrical system is supplied to the second partial on-board electrical system by means of the first and second DC-DC converters and in the event of a failure of the first or second DC-DC converter, energy is supplied from the first partial on-board electrical system to the second partial on-board electrical system by means of the DC-DC converter that has not failed. Consequently, the probability of a failure of the second on-board electrical system voltage can be reduced. The functionality of electrical components that are supplied with the second on-board electrical system voltage can thus be maintained. Redundancy in an on-board electrical system by means of at least two DC-DC converters also offers the potential to minimize the weight increase and space requirements of such a system compared to the prior art.

According to an example embodiment, the second partial on-board electrical system has at least two parallel strands and an electrical component, wherein the electrical component is connected to both strands. Such a design offers the advantage that a failure of one of the two strands can be compensated for by supplying the electrical component via the respective other strand.

According to an example embodiment, each strand comprises a distribution unit with a fuse. The distribution unit can protect the strand against undesired operating states, such as fault currents or short circuits. This can increase the protection of the electrical components of the second partial on-board electrical system.

According to an example embodiment, the second partial on-board electrical system has a main distribution unit which is connected to the distribution units of the strands and to the first and second DC-DC converters. The main distribution unit can form a central distribution point of the second partial on-board electrical system, via which the entire energy flow from the first partial on-board electrical system is routed to the second partial on-board electrical system. Furthermore, the supply of electrical energy can be maintained in a fault mode via the main distribution unit.

According to an example embodiment, the second partial on-board electrical system, in particular the main distribution unit of the second partial on-board electrical system, has a system for charging or discharging the energy store. In an example embodiment, an active management of the energy store is used, as is the case, for example, with energy stores designed as lithium-ion accumulators. The system for charging and discharging the energy store can prevent damage to the energy store caused by deep discharging or overcharging. In this manner, the service life of the energy store can be increased.

According to an example embodiment, a ratio of the second on-board electrical system voltage to the first on-board electrical system voltage is in the range of 0.01 to 0.04, or, in a further example embodiment, in the range of 0.015 to 0.03. With such a design, it is possible to operate a traction drive of the vehicle with a higher, first on-board electrical system voltage and electronic components, such as control units, with the much lower second on-board electrical system voltage. For example, the first on-board electrical system voltage can be in the range of 400 V to 800 V and the second on-board electrical system voltage in the range of 12 V to 48 V.

The object mentioned at the outset is further achieved by a method for operating an on-board electrical system for a motor vehicle, having a first partial on-board electrical system which has a first on-board electrical system voltage, having a second partial on-board electrical system which has a second on-board electrical system voltage, wherein the second on-board electrical system voltage is lower than the first on-board electrical system voltage, having a first and a second DC-DC converter which are each arranged between the first and the second partial on-board electrical system, and having an energy store which is arranged in the second on-board electrical system, wherein in a normal operating mode, energy from the first partial on-board electrical system is supplied to the second partial on-board electrical system by means of the first and second DC-DC converters.

The method according to the disclosure can achieve the same advantages that have already been described in connection with the on-board electrical system according to the disclosure. If there is no failure, the on-board electrical system is operated in the normal operating mode. The normal operating mode describes the state in which the DC-DC converters transfer the electrical energy from the first partial on-board electrical system to the second partial on-board electrical system.

According to an example embodiment of the method, in the event of a failure of the first DC-DC converter, the on-board electrical system transitions to a first fault mode in which the second DC-DC converter supplies the second partial on-board electrical system with energy. In this first fault mode, the second DC-DC converter can continue to supply the electrical components in the second partial on-board electrical system with electrical energy.

According to an example embodiment of the method, in the event of a failure of the first and second DC-DC converters or of the first partial on-board electrical system, the on-board electrical system transitions to a second fault mode in which the energy store supplies the second partial on-board electrical system with energy. The second fault mode makes it possible to compensate for the failure of the entire first partial on-board electrical system or the DC-DC converters, at least for a certain period of time. The period of time is limited by the energy content of the energy store. Advantageously, electrical components of the motor vehicle supplied from the second partial on-board electrical system are therefore brought into a fail-safe state in the second fault mode in which the least possible damage to the user of the motor vehicle is to be expected. For example, a locking system of the motor vehicle can be brought into its open position in the fail-safe state so that a user of the motor vehicle can open the doors in order to exit the motor vehicle.

According to an example embodiment of the method, it is provided that the second partial on-board electrical system has at least two parallel strands and an electrical component, wherein the electrical component is connected to both strands, and wherein, in the event of a failure of one of the two strands, the on-board electrical system transitions to a third fault mode in which the electrical component is supplied by the other of the two strands with energy. In an example embodiment, the electrical component is an electrical consumer, for example, a control unit. The fact that two parallel strands are provided in the second partial on-board electrical system and the electrical component is connected to these two strands means that the electrical component can continue to operate, at least with reduced power, even in the event of a failure of one of the strands.

Alternatively or in addition to the example embodiments explained above, the features and embodiments described in connection with the redundantly designed on-board electrical system according to the disclosure can also be used by themselves or in combination in the method.

BRIEF DESCRIPTION OF THE DRAWINGS

Further details, features and advantages of the disclosure are shown in the drawing and in the following description of an exemplary embodiment. In the drawings:

FIG. 1 shows an on-board electrical system according to an exemplary embodiment of the disclosure in a schematic block diagram.

DETAILED DESCRIPTION

FIG. 1 shows an exemplary embodiment of an on-board electrical system 1 according to the disclosure for a motor vehicle that is designed as an electric vehicle, in particular as an autonomous electric vehicle. The on-board electrical system 1 has a first partial on-board electrical system 10 and a second partial on-board electrical system 20. The first partial on-board electrical system 10 comprises a high-voltage energy store 11 and further high-voltage functions 12, 13. The second partial on-board electrical system 20 is responsible for supplying the low-voltage functions and has a main distribution unit 21, an energy store 22, two parallel strands 23' and 24', wherein further distribution units 23 and 24 with fuses are located within these strands, and electrical components 25, 26 and 27. Two DC-DC converters 5, 6 connect the first partial on-board electrical system and the second partial on-board electrical system.

The first partial on-board electrical system 10 comprises all high-voltage functions. These high-voltage functions 12, 13 can, for example, be designed as electric drive units of the motor vehicle. In addition, the first partial on-board electrical system contains a voltage source in the form of a high-voltage energy store 11. This high-voltage energy store 11 is designed as a battery and supplies the high-voltage functions 12, 13 as well as the DC-DC converters 5, 6 with electrical energy. The on-board electrical system voltage of the first partial on-board electrical system has an operating voltage of 400 V. This operating voltage is sufficient in order to supply the drive units and other high-voltage functions with power. Alternatively, the first on-board electrical system voltage can have a higher value, for example 800 V.

The connection of the first and second partial on-board electrical systems is established via the DC-DC converters 5, 6. The second partial on-board electrical system is operated with a second on-board electrical system voltage that is lower than the first on-board electrical system voltage. The low-voltage functions 25, 26 and 27 require a second on-board electrical system voltage, in this case 12 V, so that the conversion ratio of the DC-DC converters 5, 6 has a value of 0.03. If the first on-board electrical system voltage has a value of 800 V, the conversion ratio of the DC-DC converters 5, 6 is 0.015.

In order to distribute the electrical energy to the low-voltage functions, the second partial on-board electrical system comprises a main distribution unit 21 coupled to the DC-DC converters 5, 6 and the energy store 22. In this exemplary embodiment, the energy store 22 is designed as a battery.

Two strands are connected to the main distribution unit 21, each comprising a distribution unit 23 and 24. The electrical components, in particular consumers, of the second partial on-board electrical system 20 are each connected to both distribution units 23 and 24. Even though only one electrical component 25 is shown in FIG. 1, which is connected to both distribution units, multiple electrical components can be provided in the second partial on-board electrical system 20. The electrical components 25 can be, for example, control units for opening and closing the doors, for the steering function or for extending a ramp. The distribution units 23, 24 have fuses in order to protect the electrical components 25 from increased currents. Furthermore, these distribution units 23, 24 can comprise relays by means of which the supply to individual components can be activated and deactivated.

The main distribution unit 21 can comprise a system for charging and discharging the energy store 22 in a targeted manner—i.e., a battery management system—for example in order to be able to operate an energy store 22 designed as a lithium-ion battery.

Provided there are no failures, the on-board electrical system 1 operates in a normal operating mode in which energy is supplied from the first partial on-board electrical system 10 to the second partial on-board electrical system 20 via both DC-DC converters 5, 6. The DC-DC converters 5, 6 convert the first on-board electrical system voltage to the level of the second on-board electrical system voltage. The main distribution unit 21 supplies the electrical components 25 with electrical energy via the parallel strands 23' and 24', which comprise the distribution units 23, 24. Any voltage fluctuations in the second partial on-board electrical system can be buffered, i.e., compensated for, by means of the energy store 22 of the second partial on-board electrical system 20.

In the event of a failure of one of the DC-DC converters 5 or 6, the second partial on-board electrical system 20 is supplied with electrical energy via the respective other DC-DC converter 5 or 6. The on-board electrical system then transitions to the first fault mode.

If the supply of electrical energy to the second partial on-board electrical system 20 via the first partial on-board electrical system 10 is interrupted, the system transitions to the second fault mode. This fault mode can occur, for example, due to a defect in the high-voltage energy store 11 or a simultaneous defect in both DC-DC converters 5, 6. The second on-board electrical system voltage required in the second partial on-board electrical system 20 is provided in this fault mode via the energy store 22 connected to the main distribution unit 21.

The third fault mode is defined by a failure of one of the two parallel strands 23' or 24'. If there is a defect in one of the two strands 23', 24', in particular one of the two distribution units 23, 24, the electrical components are supplied via the respective other strand 23', 24' or the respective other distribution unit 23, 24.

The invention claimed is:

1. An on-board electrical system for a motor vehicle, comprising:

a first on-board electrical system having a first on-board electrical system voltage, a second on-board electrical system having:

a second on-board electrical system voltage lower than the first on-board electrical system voltage, and two parallel strands and one electrical component connected to both strands, and when a failure of one of the two parallel strands occurs, the electrical component is supplied with energy via a remaining one of the two parallel strands, and a first DC-DC converter and a second DC-DC converter arranged between the first and the second on-board electrical systems, and, in a normal operating mode, energy from the first on-board electrical system is supplied to the second on-board electrical system via the first and second DC-DC converters, and an energy store arranged in the second on-board electrical system, and, when a failure of one of the first or second DC-DC converters occurs, energy is supplied from the first on-board electrical system to the second on-board electrical system via a remaining one of the first or second DC-DC converters that has not failed, and, when a failure of both the first and second DC-DC converters or of the first on-board electrical system occurs, energy is supplied to the second on-board electrical system via the energy store.

2. The on-board electrical system according to claim 1, wherein the first on-board electrical system further comprises a high-voltage energy store.

3. The on-board electrical system according to claim 2, further comprising a control device configured such that, when a failure of one of the first or second DC-DC converters occurs, energy is supplied from the first on-board electrical system to the second on-board electrical system via a remaining one of the first or second DC-DC converter that has not failed.

4. The on-board electrical system according to claim 3, wherein each of the two parallel strands comprises a distribution unit with a fuse.

5. The on-board electrical system according to claim 4, wherein the second on-board electrical system has a main distribution unit which is connected to the distribution units of the two parallel strands and to the first and second DC-DC converters.

6. The on-board electrical system according to claim 5, wherein the main distribution unit of the second on-board electrical system has a system for charging or discharging the energy store.

7. The on-board electrical system according to claim 6, wherein a ratio of the second on-board electrical system voltage to the first on-board electrical system voltage is in a range of 0.01 to 0.04.

8. The on-board electrical system according to claim 6, wherein a ratio of the second on-board electrical system voltage to the first on-board electrical system voltage is in a range of 0.015 to 0.03.

9. The on-board electrical system according to claim 6, wherein the first on-board electrical system voltage is in a range of 400 V to 800 V and the second on-board electrical system voltage is in a range of 12 V to 48 V.

10. The on-board electrical system according to claim 6, wherein the motor vehicle is an autonomous motor vehicle.

11. The on-board electrical system according to claim 6, wherein the energy store and the high-voltage energy store are batteries.

12. The on-board electrical system according to claim 6, wherein the energy store is configured to compensate for voltage fluctuations that occur in the second on-board electrical system.

13. The on-board electrical system according to claim 6, wherein the first DC-DC converter and the second DC-DC converter are arranged redundantly with respect to one another.

14. A method for operating an on-board electrical system for a motor vehicle, comprising:

providing an on-board electrical system comprising:

a first on-board electrical system having a first on-board electrical system voltage, a second on-board electrical system having:

a second on-board electrical system voltage lower than the first on-board electrical system voltage, and two parallel strands and one electrical component connected to both strands, a first and a second DC-DC converter arranged between the first and the second on-board electrical systems, and an energy store arranged in the second on-board electrical system, supplying, in a normal operating mode, energy from the first on-board electrical system to the second on-board electrical system via the first and second DC-DC converters, and when a failure of one of the two parallel strands occurs, transitioning the on-board electrical system to a third fault mode in which the electrical component is supplied with energy via a remaining one of the two parallel strands, and, when a failure of one of the first or second DC-DC converters occurs, transitioning the on-board electrical system to a first fault mode in which the remaining one of the first or second DC-DC converters supplies the second on-board electrical system with energy, and, when a failure of both the first and second DC-DC converters or of the first on-board electrical system occurs, transitioning the on-board electrical system to a second fault mode in which the energy store supplies the second on-board electrical system with energy.

15. The method according to claim 14, wherein when a failure of the first and second DC-DC converters or of the first on-board electrical system occurs, transitioning the on-board electrical system to the second fault mode in which the energy store solely supplies the second on-board electrical system with energy.

16. The method according to claim 14, wherein each of the two parallel strands comprises a distribution unit with a fuse.

17. A method for operating an on-board electrical system of a motor vehicle, comprising:

providing an on-board electrical system that includes:

a first on-board electrical system, a second on-board electrical system coupled to the first on-board electrical system by a first DC-DC converter and a second DC-DC converter, and two parallel power strands in the second on-board electrical system, an electrical component being electrically connected to both power strands, and during normal operation, supplying energy from the first on-board electrical system to the second on-board electrical system through the first and second DC-DC converters, and when a failure of one of the two parallel power strands occurs, supplying the electrical component with energy via a remaining one of the two parallel power strands.

* * * * *